(12) United States Patent
Shimizu

(10) Patent No.: US 9,837,803 B2
(45) Date of Patent: Dec. 5, 2017

(54) RESIN MOLDED ARTICLE

(75) Inventor: Isanori Shimizu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 709 days.

(21) Appl. No.: 13/701,049

(22) PCT Filed: Jun. 2, 2011

(86) PCT No.: PCT/JP2011/062738
§ 371 (c)(1),
(2), (4) Date: Nov. 30, 2012

(87) PCT Pub. No.: WO2011/152502
PCT Pub. Date: Dec. 8, 2011

(65) Prior Publication Data
US 2013/0071614 A1    Mar. 21, 2013

(30) Foreign Application Priority Data

Jun. 2, 2010    (JP) .................. 2010-126716

(51) Int. Cl.
*B32B 3/24*    (2006.01)
*H02G 3/08*    (2006.01)
(Continued)

(52) U.S. Cl.
CPC ........... *H02G 3/08* (2013.01); *B29C 45/0025* (2013.01); *B29C 2045/0027* (2013.01);
(Continued)

(58) Field of Classification Search
CPC ................................................ B29C 45/0025
(Continued)

(56) References Cited

U.S. PATENT DOCUMENTS 7,700,177 B2 *    4/2010    Kanzaka et al. .............. 428/131
2008/0286988 A1 *    11/2008    Yanai et al. ................... 439/55
2008/0305291 A1    12/2008    Nakaoka et al.

FOREIGN PATENT DOCUMENTS

CN    101323162 A    12/2008
JP    6112311 A    1/1986
(Continued)

OTHER PUBLICATIONS

International Search Report dated Aug. 9, 2011 from the International Searching Authority in counterpart application No. PCT/JP2011/062738.

(Continued)

*Primary Examiner* — William P Watkins, III
(74) *Attorney, Agent, or Firm* — Sughrue Mion, PLLC

(57) ABSTRACT

Provided is a resin molded article which makes it possible to prevent breakage of a resin and collar loss at joint sections. A resin molded article (1) is formed by resin injection, and comprises a main body (2) and a joint section (3) integrally formed at an outer wall surface (4) of the main body (2) and having a cylindrical section (11) configured to insert therethrough the joint member for attaching the main body (2) to a mating member (6). The joint section (3) is formed to be asymmetric about a perpendicular plane (19) which passes through the central axis (18) of the cylindrical sections (11), and is perpendicular to the outer wall surface (4) of the main body (2).

3 Claims, 7 Drawing Sheets

(51) Int. Cl.
*B29C 45/00* (2006.01)
*B29L 31/44* (2006.01)
*B29L 31/34* (2006.01)
*H02G 3/10* (2006.01)

(52) U.S. Cl.
CPC ............... *B29C 2045/0093* (2013.01); *B29L 2031/3481* (2013.01); *B29L 2031/445* (2013.01); *H02G 3/086* (2013.01); *H02G 3/10* (2013.01); *Y10T 428/24298* (2015.01); *Y10T 428/24777* (2015.01)

(58) Field of Classification Search
USPC .......................................................... 428/131
See application file for complete search history.

(56) References Cited

FOREIGN PATENT DOCUMENTS

| JP | 62111711 | A | 5/1987 |
|---|---|---|---|
| JP | 269215 | A | 3/1990 |
| JP | 2225012 | A | 9/1990 |
| JP | 4163135 | A | 6/1992 |
| JP | 4135320 | U | 12/1992 |
| JP | 5293856 | A | 11/1993 |
| JP | 9234757 | A | 9/1997 |
| JP | 2008235855 | A | 10/2006 |
| JP | 2008302667 | A | 12/2008 |

OTHER PUBLICATIONS

Written Opinion dated Aug. 9, 2011 from the International Searching Authority in counterpart application No. PCT/JP2011/062738.
Communication dated Dec. 5, 2013, issued by the Korean Intellectual Property Office in corresponding Application No. 10-2012-7031291.
Communication dated Mar. 28, 2014 from the State Intellectual Property Office of P.R. China in a counterpart application No. 201180026989.8.
Office Action dated Jul. 1, 2014 issued by the Japanese Patent Office in counterpart Japanese Patent Application No. 2010-126716.

* cited by examiner

… (1)

RESIN MOLDED ARTICLE

TECHNICAL FIELD

The present invention relates a resin molded article having joint sections for attaching a mating member.

BACKGROUND ART

FIG. 9 shows an electric connection box as a resin molded article 100, in which electric components, such as a terminal and a bus bar, are contained. The resin molded article 100 as the electric connection box includes a main body 110 for containing the electric components, and joint sections 120 for attaching the main body 110 to a mating member, such as an actuator.

Two joint sections 120 are formed to be spaced apart each other on the outer wall surface 115 of the main body 110. Each of the joint sections 120 is integrally formed with the main body 110 to protrude from the outer wall surface 115 on an upper side of the main body 120. The joint section 120 is attached to the mating member by inserting a joint member, such as a screw, into and through the joint section and screwedly fastening the joint member extended therethrough to the mating member. Therefore, the joint section 120 has a cylindrical section 121 extending in a direction extending through a paper surface and adapted to allow the joint member to be inserted therein and therethrough. A collar (bushing) is insert-molded in the cylindrical section 121.

As shown in FIG. 10, a pair of inclined wall sections 123 for providing strength to the cylindrical section 121 are obliquely and integrally extended from the left and right sides of the cylindrical section 121, and an extended end portion of each of the inclined wall sections 123 is provided to be connected to the outer wall surface 115 of the main body 110. The inclined wall sections 123 on both the left and right sides of the cylindrical section 121 integrally extend over an equal length, and thus the entire of the joint section 120 form a triangle (equilateral triangle), thereby achieving lightweighting and compacting thereof. The left and right inclined wall sections 123 are formed to have an equal thickness. In addition, bored sections 125 are respectively formed between each of the inclined wall sections 123 and the outer wall surface 115 of the main body 110, and thus deforming prevention and the like upon molding is achieved.

FIG. 11A is a sectional view taken along a line A-A in FIG. 10 and FIG. 11B is a sectional view taken along a line B-B in FIG. 10. As shown in FIGS. 11A and 11B, bottom wall sections 127 are respectively formed on a longitudinal end portion of each of the bored sections 125 to connect the outer wall surface 115 of the main body 110 with the inclined wall sections 123. A thickness of each of the bottom wall sections 127, similarly to the inclined wall sections 123, is formed to be equal to each other.

The thicknesses of the left and right inclined wall sections 123 and the thicknesses of the bottom wall sections 127 continued from the left and right inclined wall sections 123 are equal. Thus, since the thicknesses of the inclined wall sections 123 and the bottom wall sections 127 are formed to be equal, the joint section 120 becomes into a left-right symmetric shape.

The resin molded article 100 as described above is formed by injection molding of a resin, and reference numeral 140 in FIG. 9 designates a location of a gate for injecting the resin into a mold. By being injected from the gate 140, the resin flows through inside the mold, and thus the main body 110 and the joint section 120 are molded.

FIG. 12 shows resin flows for forming the joint section 120. As shown in an arrow, the resin upwardly flow at an equal flow rate through the left and right inclined wall sections 123 and then flows of the resin meet at the apex of the triangle at which the left and right inclined wall sections 123 are coupled to each other. FIG. 13 shows a top surface of the joint section 120. In FIGS. 12 and 13, reference numeral 150 designates a welded portion at which flows of the resin meet, and the welded portion 150 is formed at the apex (i.e., a leading end central portion of the cylindrical section 121) of the triangle.

Meanwhile, as patent documents related to the resin molded article 100 as described above, the following Patent Documents 1 to 5 can be cited.

PRIOR ART DOCUMENT

Patent Documents

Patent Document 1: JP-A-H5-293856
Patent Document 2: JP-A-S62-111711
Patent Document 3: JP-A-H2-69215
Patent Document 4: JP-A-S61-12311
Patent Document 5: JP-A-H4-163135

SUMMARY OF INVENTION

Problems to be Solved by Invention

The resin molded article 100 shown in FIG. 9 is attached to the mating member by inserting the joint member into and through the cylindrical section 121. In such a attached state, when an external vibration (in particularly, a vertical vibration) from a vehicle and the like is transferred through the mating member, a stress concentrically acts on the apex of the triangle of the joint section 120 at which the left and right inclined wall sections 123 are coupled to each other. However, the welded portion 150, at which the flows of the resin meet, exists on the apex of the triangle-shaped joint section 120, and thus strength of the portion is weakened. In other words, a portion in the joint section 120, on which the stress concentrically acts, corresponds to a portion which is weakened in strength. Therefore, the resin in the joint section 120 is broken or the collar inserted therein is separated, thereby causing reduction in strength. As a result, when the resin molded article 100 is an electric connection box, there is a problem in that connection is poor and thus the electric connection box cannot operate.

Accordingly, an object of the present invention is to provide a resin molded article which makes it possible to prevent breakage of a resin or separation of a collar in a joint section.

Means for Solving Problems

In order to achieve the above object, a first invention is a resin molded article formed by injecting resin, the resin molded article including: a main body; and a joint section integrally formed on an outer wall surface of the main body, the joint section including a cylindrical section configured to insert therethrough a joint member for attaching the main body to a mating member, characterized in that the joint section is formed to be asymmetric about a perpendicular plane which passes through a central axis of the cylindrical section and which is perpendicular to the outer wall surface of the main body.

A second invention is characterized, in addition to the resin molded article according to the first invention, in that the joint section includes a pair of left and right inclined wall sections integrally extending from both sides of the cylindrical section toward the outer wall surface of the main body; and bored sections respectively formed between each of the inclined wall sections and the outer wall surface of the main body, and wherein the pair of left and right inclined wall sections are asymmetric in thickness about the perpendicular plane.

A third invention is characterized, in addition to the resin molded article according to the second invention, in that bottom wall sections are respectively formed at end portions of the bored sections to connect the respective inclined wall sections with the outer wall surface of the main body, and wherein each of the bottom wall sections is asymmetric in thickness about the perpendicular plane.

Advantageous Effects of Invention

According to the first invention, an amount of resin in the joint section is asymmetric about the perpendicular plane which passes through the central axis of the cylindrical section and which is perpendicular to the outer wall surface of the main body, and thus a welded portion in the joint section, at which flows of the resin meet, can be located at a location deviated from a portion on which an external stress is exerted. As a result, the stress doesn't concentrically acts on the welded portion which is weak in strength, and breakage of the resin or separation of a collar in the join section can be prevented.

According to the second invention, the pair of left and right inclined wall sections are asymmetric in thickness about the perpendicular plane, and thus the welded portion in the inclined wall sections can be located at a location deviated from a portion on which the stress is concentrated. As a result, breakage of the resin or separation of a collar in the join section can be prevented.

According to the third invention, the bottom wall sections connecting the pair of left and right inclined wall sections with the outer wall surface of the main body are asymmetric in thickness about the perpendicular plane, and thus the welded portion in the inclined wall sections can be located at a location deviated from a portion on which the stress is concentrated. As a result, breakage of the resin or separation of a collar in the join section can be prevented.

BRIEF DESCRIPTION OF DRAWINGS

FIGS. 3A and 3B are views showing the resin molded article, wherein FIG. 3A is a plan view of the resin molded article and FIG. 3B is a front view of the resin molded article.

FIGS. 5A and 5B are views sowing the joint section in the resin molded article, wherein FIG. 5A is a sectional view taken along a line A-A in FIG. 4 and FIG. 5B is a sectional view taken along a line B-B in FIG. 4.

FIGS. 11A and 11B are views showing the joint section in the resin molded article according to the related art, wherein FIG. 11A is a sectional view taken along a line A-A in FIG. 10 and FIG. 11B is a sectional view taken along a line B-B in FIG. 10.

EMBODIMENT OF INVENTION

Figure 1:
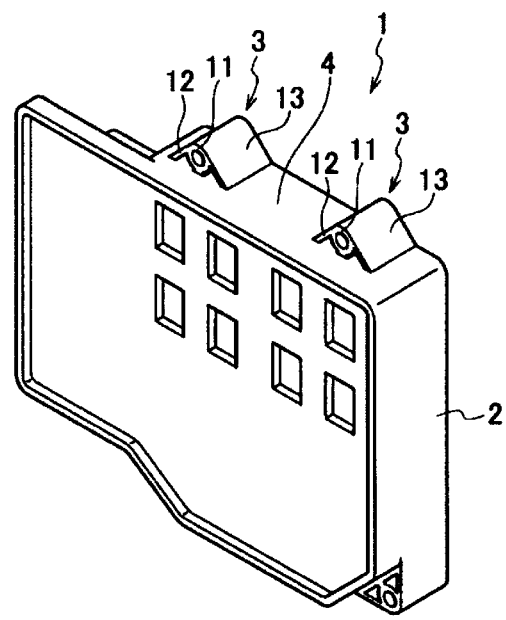
FIG. 1 is a perspective view showing a resin molded article according to an illustrative embodiment of the present invention.
Figure 2:
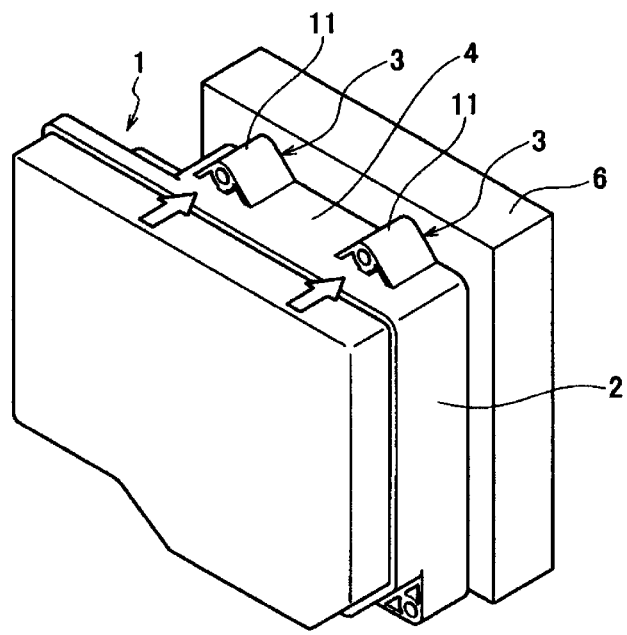
FIG. 2 is a perspective view showing a state of attaching the resin molded article to a mating member.
Figure 3A:
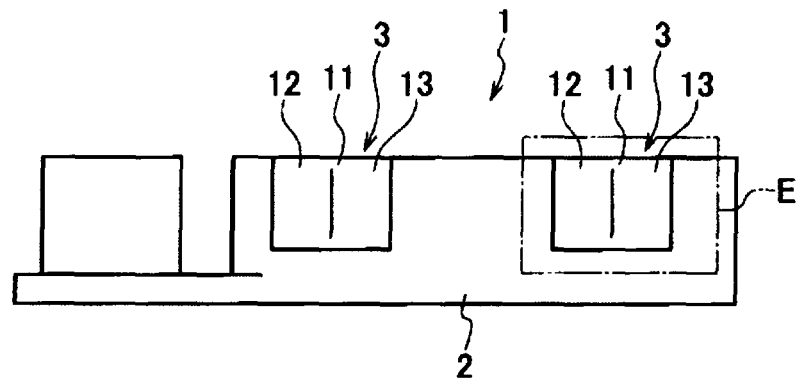
Figure 3B:
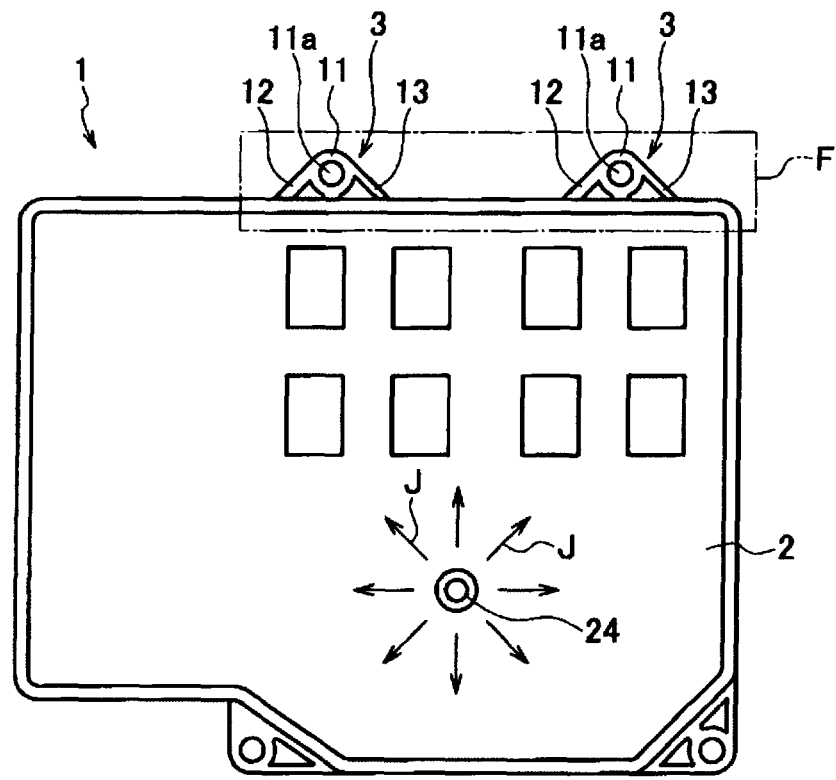
Figure 4:
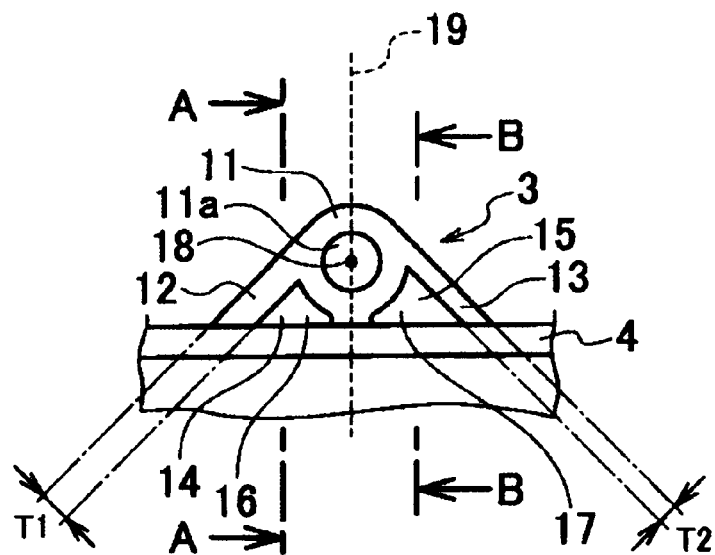
FIG. 4 is a front view showing a joint section in the resin molded article.
Figure 5A:
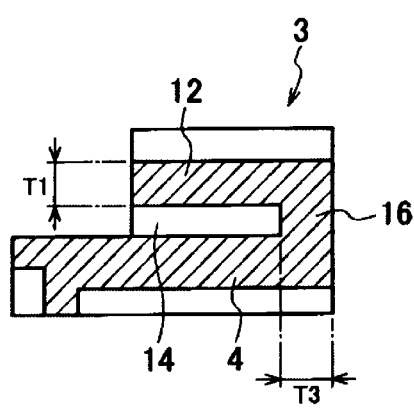
Figure 5B:
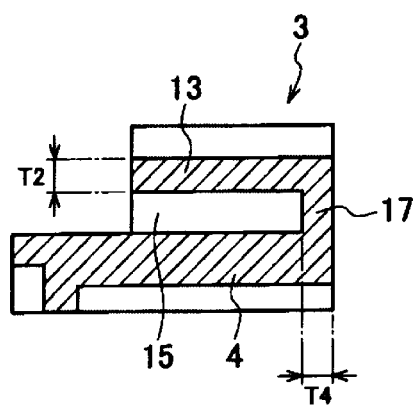
Figure 6:
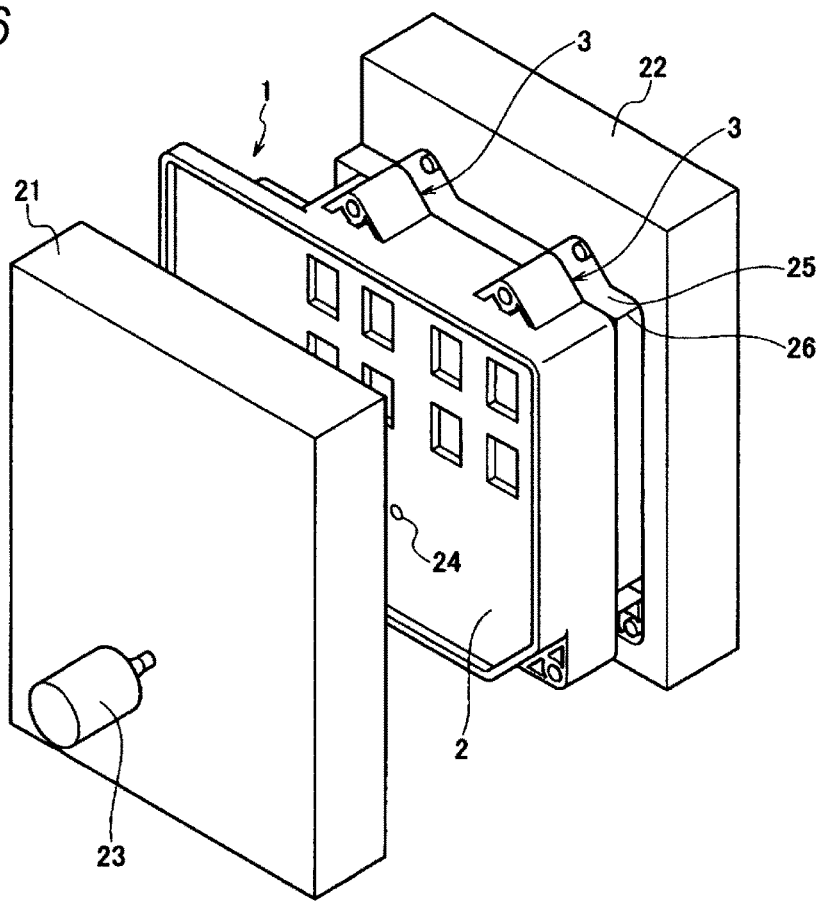
FIG. 6 is a perspective view showing a mold for injection molding the resin molded article.
Figure 7:
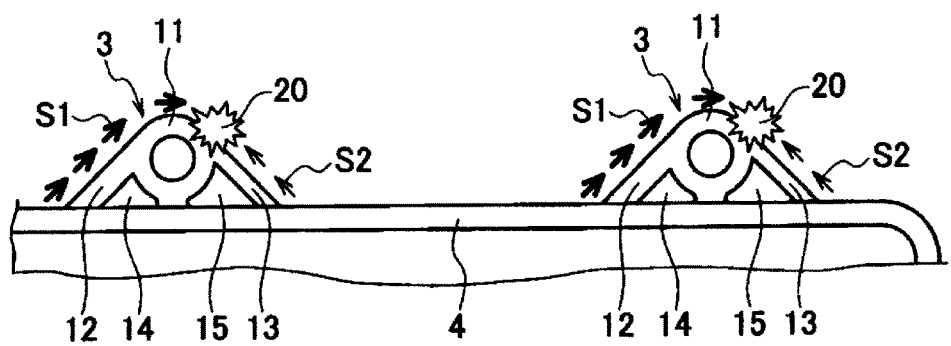
FIG. 7 is a front view showing a resin flow in the joint section, which is an enlarged view of a section F in FIG. 3B.
Figure 8:
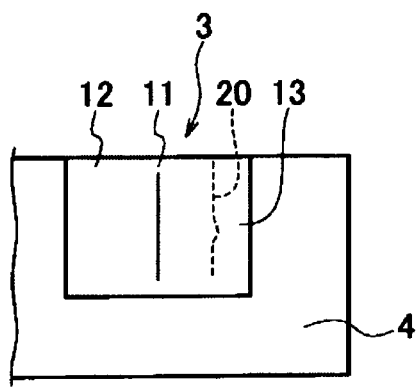
FIG. 8 is an enlarged plan view of a section E in FIG. 3A.
Figure 9:
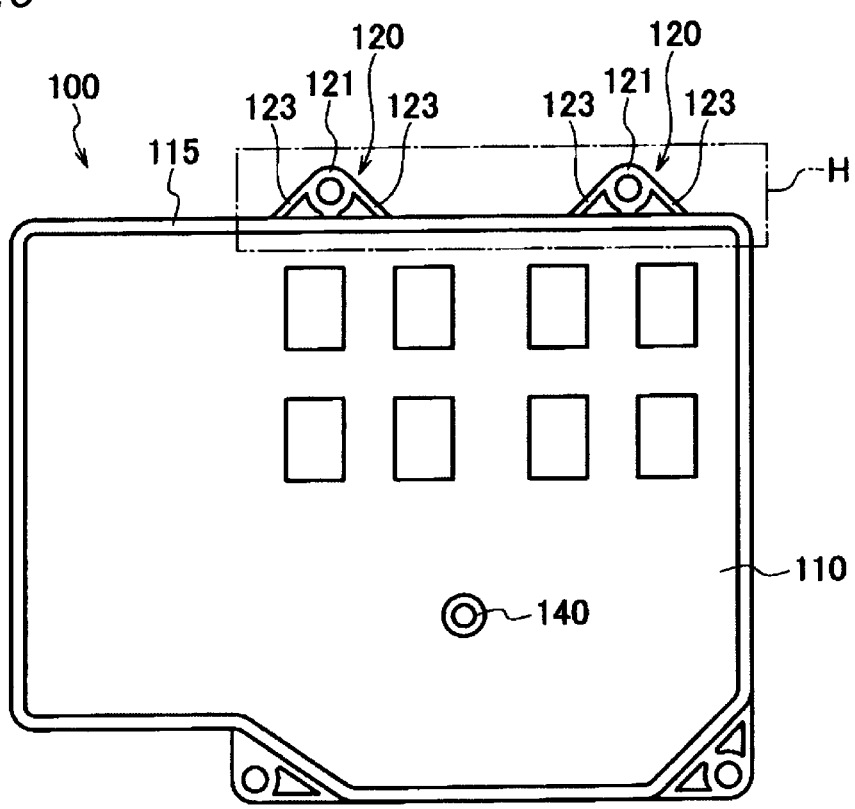
FIG. 9 is a front view showing a resin molded article according to the related art.
Figure 10:
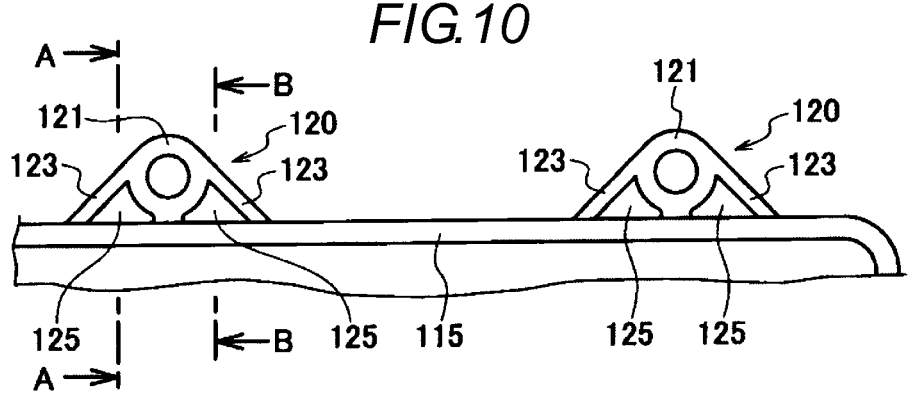
FIG. 10 is a view showing a joint section in the resin molded article according to the related art, which is an enlarged front view of a section H in FIG. 9.
Figure 11A:
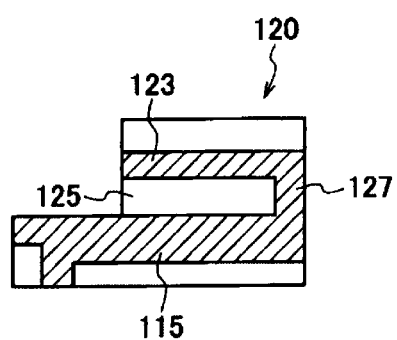
Figure 11B:
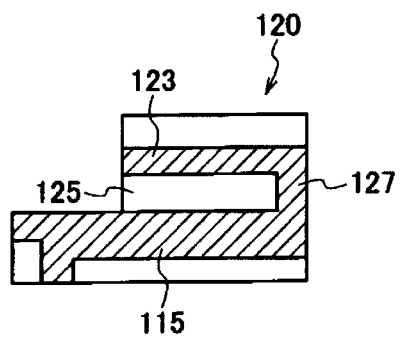
Figure 12:
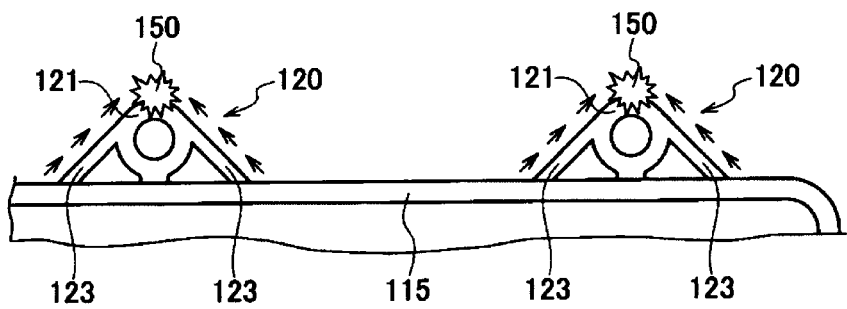
FIG. 12 is a front view showing a resin flow in the joint section of the resin molded article according to the related art.
Figure 13:
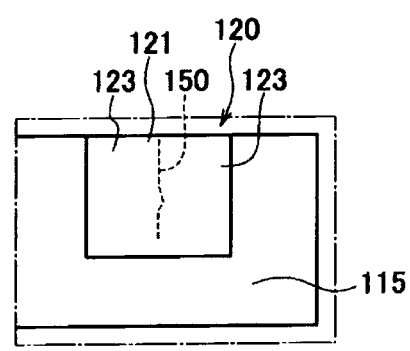
FIG. 13 is a plan view showing the joint section in the resin molded article according to the related art.

The present invention will be now described with reference to an illustrative embodiment shown in the accompanying drawings. FIG. 1 is a perspective view showing a resin molded article according to the embodiment of the present invention, FIG. 2 is a perspective view showing a state of being attached to a mating member, FIGS. 3A and 3B are, respectively, a plan view and a front view of the resin molded article, FIG. 4 is a front view showing a joint section in the resin molded article, and FIGS. 5A and 5B are, respectively, a sectional view taken along a line A-A and a sectional view taken along a line B-B in FIG. 4. FIG. 6 is a perspective view showing a mold for injection molding the resin molded article, FIG. 7 is a front view showing a resin flow in the joint section, and FIG. 8 is a front view showing the joint section.

A resin molded article 1 is applied, for example, to an electric connection box built in a vehicle and, as shown in FIG. 1, is constituted of a box-shaped main body 2 and joint sections integrally formed on an upper surface of the main body 2. Electric components (not shown), such as a terminal and a bus bar, are contained within the box-shaped main body 2.

The joint sections 3 are integrally formed with the main body 2 to protrude from an outer wall surface 4 on an upper side of the main body 2. In this embodiment, two joint sections 3 are formed to be spaced apart each other on the outer wall surface 4 of the main body 2. A joint member (not shown), such as a screw, is inserted into and through each of the joint sections 3 and the joint member extended therethrough is screwedly fastened to a mating member 6 (see FIG. 2). As a result, the resin molded article 1 is attached to the mating member 6.

FIG. 2 shows a case of using an actuator as the mating member 6, in which the upper portion of the resin molded article 1 is connected to the mating member 6 by inserting the joint members into and through the joint sections 3. Therefore, the resin molded article 1 is attached in a form, in which the main body 2 is suspended from the mating member 6.

As shown in FIGS. 3A, 3B, 4 and 7, each of the joint sections 3 is constituted of a cylindrical section 11 and a pair of first and second inclined wall sections 12 and 13, which extend obliquely from both the left and right sides of the cylindrical section 11 toward the outer wall surface 4 of the main body 2.

The cylindrical section 11 allows the joint member to be inserted therein and therethrough and extends with an inserting through hole 11a in a direction extending through a paper surface in FIG. 3B or 4 (i.e., a direction perpendicular to the paper surface). A lower end of the cylindrical section 11 is integrally formed with the outer wall surface 4 of the main body 2 to be continued to the outer wall surface 4. For example, a collar (bushing) is insert-molded in the cylindrical section 11.

The pair of inclined wall sections 12 and 13 is intended to provide strength (reinforcement) to the cylindrical section 11, and in this embodiment, is provided such that the first inclined wall section 12 is obliquely and integrally extended from the left side of the cylindrical section 11 in a downward direction, whereas the second inclined wall section 13 is obliquely and integrally extended from the right side of the cylindrical section 11 in a downward direction, and thus each of extended end portions thereof is connected to the outer wall surface 4 of the main body 2. These inclined wall sections 12 and 13, similarly to the cylindrical section 11, extend in the direction extending through the paper surface in FIG. 3B or 4. In other words, the inclined wall sections 12 and 13 extend in a left-right direction, which is a width direction of the outer wall surface 4, in FIGS. 5A and 5B. The first inclined wall section 12 and the second inclined wall section 13 have an equal length and are obliquely and downwardly extended from both the left and right sides of the cylindrical section 11, and as a result, the entire of the joint section 13 forms an equilateral triangle around the cylindrical section 11. Thus, since the entire of the joint section 13 forms the equilateral triangle, lightweighting and compacting of the joint section 13 can be achieved.

A first bored section 14 and a second bored section 15 are formed between each of the inclined wall sections 12 and 13 in the joint section 3 and the outer wall section 4 of the main body 2. The first bored section 14 is formed to correspond to the first inclined wall section 12 and the second bored section 15 is formed to correspond to the second inclined wall section 13. Since the bored sections 14 and 15 are formed in the joint section 3, deforming prevention of the joint section 3 upon molding and the like, can be achieved.

Each of the bored sections 14 and 15 extends in the direction extending through the paper surface in FIG. 3B or 4 and, as shown in FIGS. 5A and 5B, the first bored section 14 extends in the same manner as the first inclined wall section 12 and the second bored section 15 extends in the same manner as the second inclined wall section 13.

As shown in FIGS. 5A and 5B, a first bottom wall section 16 and a second bottom wall section 17 are respectively formed on an extended end portion of each of the bored sections 14 and 15. The first bottom wall section 16 is formed on the end portion of the first bored section 14 to correspond to the first bored section 14 and the second bottom wall section 17 is formed on the end portion of the second bored section 15 to correspond to the second bored section 15.

These bottom wall sections 16 and 17 are formed to close the end portions of the corresponding bored sections 14 and 15, and thus are provided to be connected between the corresponding inclined wall section 12 and 13 and the outer wall section 4 of the main body 2. Specifically, as shown in FIGS. 5A and 5B, the first bottom wall section 16 on the side of the first bored section 14 connects the first inclined wall section 12 with the outer wall section 4 of the main body 2 and the second bottom wall section 17 on the side of the first bored section 15 connects the second inclined wall section 13 with the outer wall section 4 of the main body 2.

FIG. 6 shows a mold for injection molding the resin molded article 1 as described above, in which a fixed mold 21 and a movable mold 22 are coupled (clamped) to form a cavity between the molds 21 and 22, and then a molten resin is injected into the cavity to mold the resin molded article 1. In FIG. 6, reference numeral 25 designates a cavity formed in the movable mold 22 and reference numeral 26 designates a rod for pushing out the resin molded article 1 formed. The fixed mold 21 is provided with a runner 23 for supplying the molten resin, and thus the resin is injected through the runner 23. In FIGS. 3A, 3B and 6, reference numeral 24 designates a location of a gate which is an injection end for the resin. The resin injected through the gate 24 flows along inside the cavity as shown in an arrow J in FIG. 3B, and thus the resin molded article 1 is molded.

According to the present embodiment, the joint section 3 is formed such that an amount of the resin is asymmetric about a perpendicular plane 19 shown in FIG. 4, which is extended through a central axis 18 of the cylindrical section 11 to be perpendicular to the outer wall surface 4 of the main body 2. Hereinafter, the detailed structure of the joint section 3 by which the amount of the resin is asymmetric will be described.

As shown in FIGS. 4, 5A and 5B, a thickness T1 of the first inclined wall section 12 is thicker than a thickness T2 of the second inclined wall section 13 (T1>T2). Thus, since the thickness of the first inclined wall section 12 is different from the thickness of the second inclined wall section 13, the thicknesses are asymmetric about the perpendicular plane 19. Therefore, the amount of the resin in the pair of the inclined wall sections 12 and 13 can be asymmetric about the perpendicular plane 19.

Also, as shown in FIGS. 4, 5A and 5B, a thickness T3 of the first bottom wall section 16 is thicker than a thickness T4 of the second bottom wall section 17 (T3>T4). Thus, since the thickness of the first bottom wall section 16 is different from the thickness of the second bottom wall section 17, the thicknesses are asymmetric about the perpendicular plane 19. Therefore, the amount of the resin in the bottom wall sections 16 and 17 can be also asymmetric about the perpendicular plane 19 (i.e., such an asymmetry can be achieved by forming the cavity to have an asymmetric volume and varying flow velocities of the resin upon molding).

As set forth above, since both the thickness T1 of the first inclined wall section 12 and the thickness T3 of the first bottom wall section 16 are formed to be thicker than both the thickness T2 of the second inclined wall section 13 and the thickness T4 of the second bottom wall section 17, a flow rate of the resin upon injection molding is, for example, relatively larger on the side of the first inclined wall section 12 and relatively smaller on the side of the second inclined wall section 13, and thus a welded portion of the resin in the joint section 3, at which flows of the resin meet, is located at a location deviated from the apex of the equilateral triangle of the joint section 3.

FIG. 7 shows flows of the resin upon injection molding according to the present embodiment. The flow rate of the injected resin is larger on the side of the first inclined wall section 12 thickly formed (arrow S1), and is smaller on the side of the second inclined wall section 13 thinly formed (arrow S2). Therefore, as shown in FIGS. 7 and 8, the welded portion 20, at which the resin flow S1 and the resin flow S2 meet, is deviated from the apex (i.e., the apex of the equilateral triangle) of the joint section 3 toward the second inclined wall section 13. Meanwhile, an external stress from the mating member concentrically acts on the apex of the joint section 3 formed in such an equilateral triangle, but doesn't concentrically acts on the welded portion 20. In other words, the stress exerted on the welded portion 20, which is weak in strength, can be reduced. As a result, breakage of the resin or separation of the collar within the cylindrical section 11 in the join section 3 can be prevented.

Although the thickness T1 of the first inclined wall section 12 and the thickness T3 of the first bottom wall section 16 are thicker than the thickness T2 of the second inclined wall section 13 and the thickness T4 of the second bottom wall section 17 in the above embodiment, the thicknesses may be inversely configured. Specifically, the thickness T2 of the second inclined wall section 13 and the thickness T4 of the second bottom wall section 17 may be thicker than the thickness T1 of the first inclined wall section 12 and the thickness T3 of the first bottom wall section 16 (T2>T1, and T4>T3). Also, the thickness T1 of the first inclined wall section 12 and the thickness T2 of the second inclined wall section 13 only may be asymmetric about the perpendicular plane 19, and the thickness T3 of the first bottom wall section 16 and the thickness T4 of the second bottom wall section 17 only may be asymmetric about the perpendicular plane 19. In this case also, since the welded portion 20 can be deviated from a portion on which the stress is concentrated, breakage of the resin or separation of the collar in the join section 3 can be prevented. In addition, the present invention can be also equally applied to resin molded articles other than the electric connection box.

Although the present invention has been described with referenced to the detailed and specific embodiment, it should be apparent to those skilled in the art that numerous changes and modifications can be made without departing the scope and spirit of the present invention.

This application claims the benefit of Japanese Patent Application Serial No. 2010-126716 filed Jun. 2, 2010, the entire contents of which are incorporated herein by reference

INDUSTRIAL APPLICABILITY

According to the resin molded article of the present invention, an amount of resin in the joint section is asymmetric about the perpendicular plane, which is extended through the central axis of the cylindrical section to be perpendicular to the outer wall surface of the main body, and thus the welded portion in the joint section, at which flows of the resin meet, is located at a location deviated from a portion on which an external stress is exerted. As a result, the stress doesn't concentrically acts on the welded portion which is weak in strength, and breakage of the resin or separation of a collar in the join section can be prevented.

DESCRIPTION OF REFERENCE NUMERALS

1 Resin molded article
2 Main body
3 Joint Section
4 Outer wall surface
6 Mating member
11 Cylindrical section
12 First inclined wall section
13 Second inclined wall section
14 First bored section
15 Second bored section
16 First bottom wall section
17 Second bottom wall section
18 Central axis
19 Perpendicular plane
T1, T2, T3, T4 Thickness

The invention claimed is:

1. A resin molded article formed by injecting resin, the resin molded article comprising:
    a main body; and
    a joint section integrally formed on an outer wall surface of the main body, the joint section comprising a cylindrical section configured to insert therethrough a joint member for attaching the main body to a mating member,
    wherein the joint section is formed to be asymmetric about a perpendicular plane which passes through a central axis of the cylindrical section and which is perpendicular to the outer wall surface of the main body,
    wherein the cylindrical section is equidistant from two ends of the joint section;
wherein the joint section comprises:
    a pair of left and right inclined wall sections integrally extending from both sides of the cylindrical section toward to outer wall surface of the main body; and
    bored sections respectively formed between each of the inclined wall sections and the outer wall surface of the main body, and
wherein the pair of left and right inclined wall sections are asymmetric in thickness about the perpendicular plane,
    wherein bottom wall sections are respectively formed at end portions of the bored sections to connect the respective inclined wall sections with the outer wall surface of the main body, and
    wherein each of the bottom wall sections is asymmetric in thickness about the perpendicular plane.
2. The resin molded article according to claim 1,
    wherein the pair of left and right inclined wall sections are equal lengths.
3. The resin molded article according to claim 1,
    wherein the joint section forms an equilateral triangle around the cylindrical section.

\* \* \* \* \*